United States Patent
Mitsunobu et al.

(10) Patent No.: US 9,344,363 B2
(45) Date of Patent: May 17, 2016

(54) INFORMATION PROCESSING SYSTEM, RELAY DEVICE, INFORMATION PROCESSING DEVICE, AND INFORMATION PROCESSING METHOD

(71) Applicant: FUJITSU LIMITED, Kawasaki-shi, Kanagawa (JP)

(72) Inventors: Hideki Mitsunobu, Kawasaki (JP); Mitsuaki Kakemizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 361 days.

(21) Appl. No.: 13/898,086

(22) Filed: May 20, 2013

(65) Prior Publication Data

US 2014/0056299 A1 Feb. 27, 2014

(30) Foreign Application Priority Data

Aug. 24, 2012 (JP) ................. 2012-184947

(51) Int. Cl.
G06F 9/455 (2006.01)
H04L 12/741 (2013.01)
H04L 29/12 (2006.01)

(52) U.S. Cl.
CPC ............ *H04L 45/74* (2013.01); *G06F 9/45558* (2013.01); *H04L 61/103* (2013.01); *G06F 2009/45595* (2013.01)

(58) Field of Classification Search
None
See application file for complete search history.

(56) References Cited

U.S. PATENT DOCUMENTS

| 2008/0209003 | A1 | 8/2008 | Mitsunobu et al. | |
| 2011/0238820 | A1* | 9/2011 | Matsuoka | G06F 9/5077 709/224 |
| 2011/0317703 | A1* | 12/2011 | Dunbar | H04L 12/462 370/392 |
| 2012/0030349 | A1* | 2/2012 | Sugai | G06F 9/5077 709/224 |
| 2012/0151493 | A1* | 6/2012 | Takase | G06F 9/5083 718/104 |
| 2014/0304342 | A1* | 10/2014 | Shekhar | G01S 5/0242 709/206 |

FOREIGN PATENT DOCUMENTS

| JP | 7-50685 | 2/1995 |
| JP | 2002-16622 | 1/2002 |
| JP | 2004-7073 | 1/2004 |
| JP | 2004-64310 | 2/2004 |
| JP | 2005-110042 | 4/2005 |
| JP | 2008-211608 | 9/2008 |
| JP | 2009-71423 | 4/2009 |

OTHER PUBLICATIONS

Japanese Office Action issued Jan. 26, 2016 in corresponding Japanese Patent Application No. 2012-184947.

* cited by examiner

*Primary Examiner* — Mohammad Adhami
(74) *Attorney, Agent, or Firm* — Staas & Halsey LLP

(57) ABSTRACT

An information processing system comprising a first computer, and a second computer configured to transmit a packet including an address of the first computer, wherein when the first computer is disconnected from a network that is for the second computer to communicate with the first computer, the second computer stops a transmission of the packet.

16 Claims, 19 Drawing Sheets

FIG. 4

| IP ADDRESS | MAC ADDRESS |
|---|---|
| 10.146.48.79 | 00-90-27-AA-74-E0 |
| 10.146.46.52 | 00-90-27-AA-74-E1 |
| 10.146.48.80 | 00-90-27-BB-86-E2 |
| 10.146.46.53 | 00-90-27-BB-86-E3 |
| 10.146.48.81 | 00-90-27-CC-86-E4 |
| 10.146.46.54 | 00-90-27-CC-86-E5 |
| 10.146.48.82 | 00-90-27-DD-86-E6 |
| 10.146.46.55 | 00-90-27-DD-86-E7 |
| ... | ... |

FIG. 5

| VM No. | IP ADDRESS | MAC ADDRESS |
|---|---|---|
| 1 | 10.146.48.79 | 00-90-27-AA-74-E0 |
| 2 | 10.146.46.52 | 00-90-27-AA-74-E1 |
| 3 | 10.146.48.80 | 00-90-27-BB-86-E2 |
| 4 | 10.146.46.53 | 00-90-27-BB-86-E3 |
| 5 | 10.146.48.81 | 00-90-27-CC-86-E4 |
| 6 | 10.146.46.54 | 00-90-27-CC-86-E5 |
| 7 | 10.146.48.82 | 00-90-27-DD-86-E6 |
| 8 | 10.146.46.55 | 00-90-27-DD-86-E7 |
| 9 | 10.146.48.83 | 00-90-27-EE-86-E8 |
| 10 | 10.146.46.56 | 00-90-27-EE-86-E9 |
| 11 | 10.146.48.84 | 00-90-27-FF-86-F0 |
| 12 | 10.146.46.57 | 00-90-27-FF-86-F1 |
| 13 | 10.146.48.85 | 00-90-27-GG-86-F2 |
| ... | ... | ... |

FIG. 6

| IP ADDRESS | MAC ADDRESS |
|---|---|
| 10.146.46.52 | 00-90-27-AA-74-E1 |
| 10.146.46.53 | 00-90-27-BB-86-E3 |
| 10.146.48.81 | 00-90-27-CC-86-E4 |
| ... | ... |

FIG. 7

| COMMUNICATION No. | MAC ADDRESS | MAC ADDRESS |
|---|---|---|
| 1 | 00-90-27-AA-74-E0 | 00-90-27-AA-74-E1 |
| 2 | 00-90-27-AA-74-E0 | 00-90-27-BB-86-E3 |
| 3 | 00-90-27-AA-74-E0 | 00-90-27-CC-86-E4 |
| 4 | 00-90-27-DD-86-E6 | 00-90-27-CC-86-E5 |
| ... | ... | ... |

INFORMATION PROCESSING SYSTEM, RELAY DEVICE, INFORMATION PROCESSING DEVICE, AND INFORMATION PROCESSING METHOD

CROSS-REFERENCE TO RELATED APPLICATION

This application is based upon and claims the benefit of priority of the prior Japanese Patent Application No. 2012-184947, filed on Aug. 24, 2012, the entire contents of which are incorporated herein by reference.

FIELD

The embodiment discussed herein is related to an information processing system, a relay device, an information processing device, and an information processing method.

BACKGROUND

A plurality of servers in a data center are connected to one another by a layer 2 (hereinafter referred to as "L2") network. In the data center, a plurality of L2 networks are connected to one another via bridges (relay devices). Communication between servers connected to different L2 networks is carried out by using a bridge. With communication in the L2 network, the physical address (hereinafter referred to as a "media access control (MAC) address") corresponding to a server to which a communication packet is destined (hereinafter referred to as the "destination server") is specified in the communication packet, thereby allowing the communication packet to be delivered to the destination.

If a server from which a communication packet is sent (hereinafter referred to as the "source server") has not yet acquired the MAC address corresponding to the destination server, an address resolution protocol (hereinafter abbreviated as an "ARP") is followed before a communication packet is sent. As a result, the source server acquires the MAC address corresponding to the destination server.

With an ARP request, a packet, in which the destination Internet protocol (IP) address assigned to the destination server, the source MAC address corresponding to the source server, and the source IP address assigned to the source server are specified, is broadcast across an L2 network. A server that receives the broadcast ARP request sends MAC address of the server as an ARP reply in a unicast manner to the source server if the destination IP address specified in the packet matches the server's own IP address.

FIG. 1 illustrates an information processing system to which a related art technology has been applied. In FIG. 1, a rack 2, a rack 3 and a bridge 10 that are included in a data center 1 are illustrated. The rack 2 includes a network 4, as well as a server 6 and a server 7 connected to the network 4. The rack 3 includes a network 5, and a server 8 and a server 9 connected to the network 5. The network 4 and the network 5 are L2 networks, and the network 4 and the network 5 are connected to the bridge 10. For example, the server 6 communicates with the server 8 through the network 4, the bridge 10 and the network 5.

For example, assume that the source server is the server 6 and the destination server is the server 8. If the server 6 has not acquired the MAC address of the server 8, the server 6 broadcasts an ARP request across the network 4. The bridge 10 receives the ARP request and determines that the destination IP address included in the packet of the ARP request is the IP address of a server connected to the network 5, and then broadcasts the ARP request from the server 6 across the network 5. Since the IP address included in the packet of the received ARP request matches the IP address of the server 8, the server 8 sends the MAC address of server 8 as an ARP reply in a unicast manner to the server 6. By means of this ARP reply, the server 6 acquires the MAC address of the server 8. Thereafter, communication at a layer 3 (hereinafter referred to as "L3") level is performed between the server 1 and the server 8.

By the way, it is known that the MAC address of a terminal belonging to an IP network connected to an asynchronous transfer mode (ATM) network is stored by an input/output (I/O) unit for the ATM network, and the I/O unit makes an ARP reply on behalf of the terminal. When the IP network is disconnected from the ATM network, the stored MAC address is deleted from the I/O unit.

[Patent Document] Japanese Laid-open Patent Publication No. 2004-64310

SUMMARY

According to an aspect of the invention, an information processing system comprising a first computer, and a second computer configured to transmit a packet including an address of the first computer, wherein when the first computer is disconnected from a network that is for the second computer to communicate with the first computer, the second computer stops a transmission of the packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates example information which is stored in an ARP cache to which the embodiment is applied;

FIG. 5 illustrates example VM information which is stored in a management server to which the embodiment is applied;

FIG. 6 illustrates an example of information stored in a bridge (relay device) to which the embodiment is applied;

FIG. 7 illustrates another example of information stored in the bridge (relay device) to which the embodiment is applied;

DESCRIPTION OF EMBODIMENT

The inventors have found out that even though the MAC address of a device disconnected from a network is deleted from a device that makes an ARP reply on behalf of the disconnected device, an L3-level packet addressed to the disconnected device is sometimes sent. According to an embodiment described below, missending of an L3-level packet addressed to a device disconnected from the network is inhibited.

Figure 1:
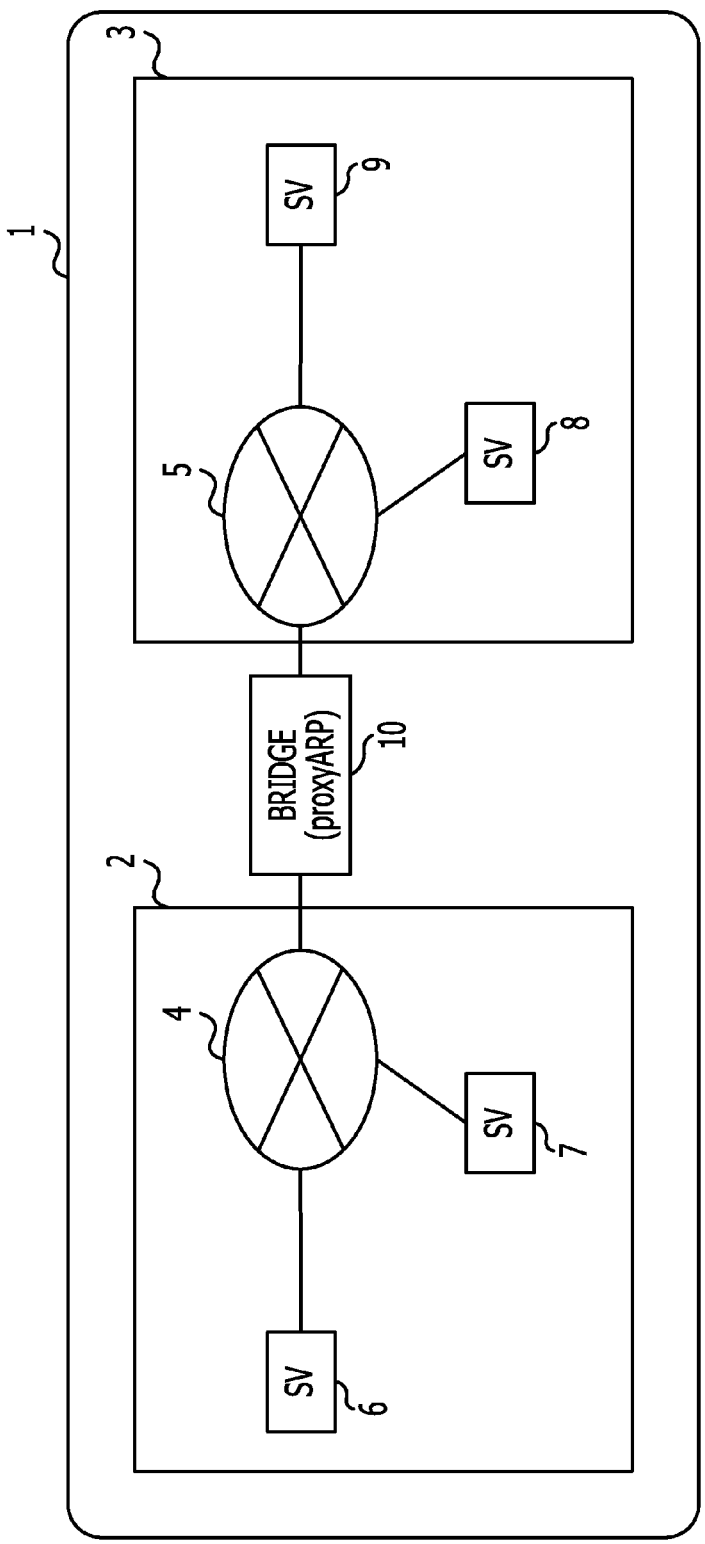
FIG. 1 illustrates an information processing system to which a related art technology is applied.
Figure 2:
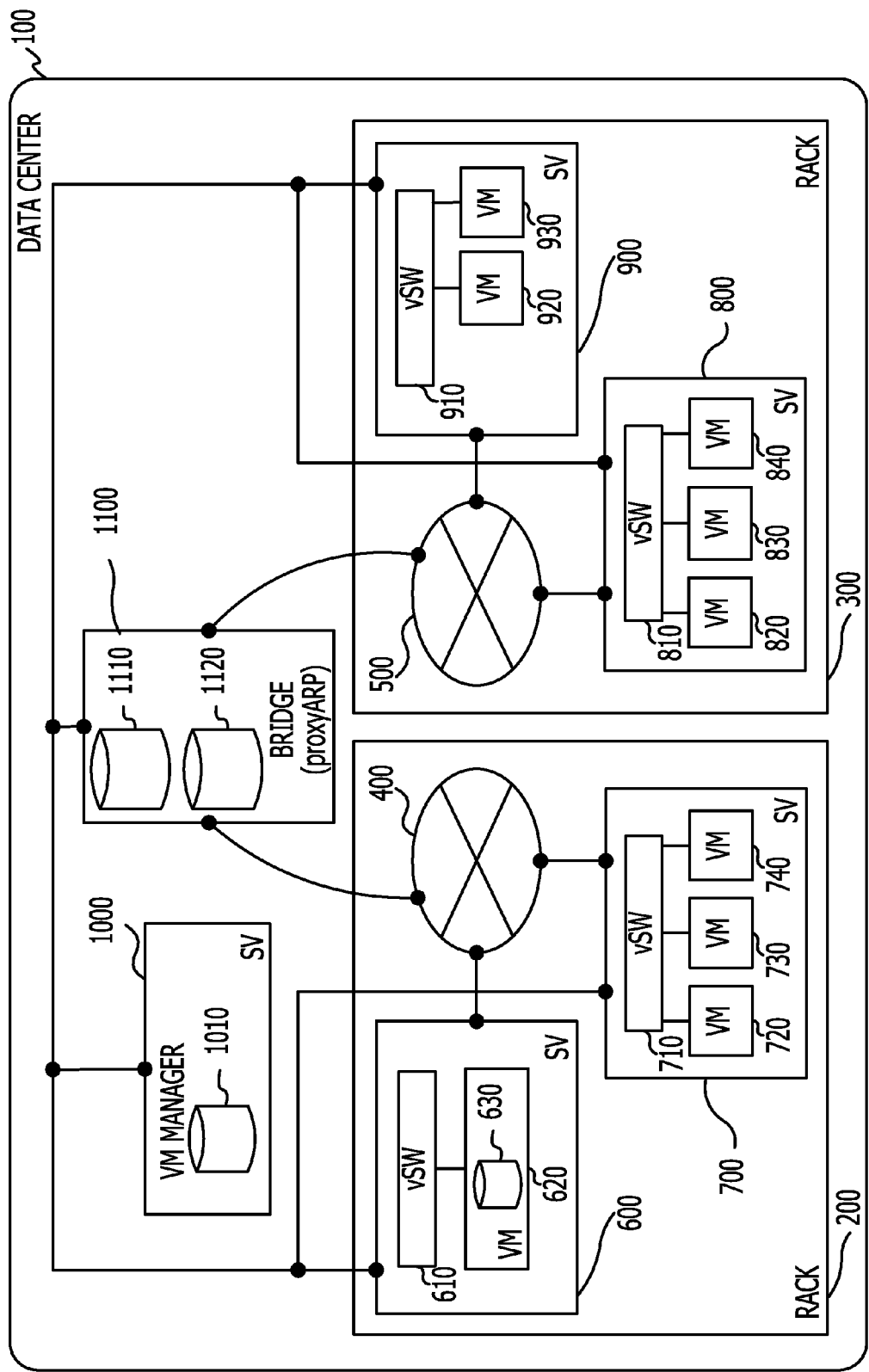
FIG. 2 illustrates an information processing system to which an embodiment is applied.

FIG. 2 illustrates an information processing system to which the embodiment is applied. FIG. 2 illustrates a data center 100 that includes a rack 200, a rack 300, a virtual machine management server (hereinafter, virtual machine is abbreviated as "VM" and server is abbreviated as "SV") 1000, and a bridge (hereinafter abbreviated as "BR") 1100. The rack 200 includes a network (hereinafter abbreviated as "NW") 400, and an SV 600 and an SV 700 which are connected to the NW 400. The rack 300 includes an NW 500, and an SV 800 and an SV 900 which are connected to the NW 500. For example, the NW 400 and the NW 500 are layer 2 (hereinafter referred to as "L2") networks, and the NW 400 and the NW 500 are connected to the BR 1100. Communication at the L2 level is communication of packets in which MAC addresses are specified, for example.

In the SV 600, a virtual switch (hereinafter abbreviated as "vSW") 610 and a VM 620 are executed. The SV 600 includes an address resolution protocol (ARP) cache 630 corresponding to the VM 620. The MAC address of another VM acquired through the execution of an ARP request by the VM 620 is stored (cached) in the ARP cache 630 for a fixed period of time. The vSW 610 sends a packet based on the MAC address stored in the ARP cache 630 to the NW 400. Although the SVs 700 to 900 may differ from the SV 600 in the number of VMs executed by the SV 600 and the functions implemented by the VM, the basic configurations of the SVs 700 to 900 are each the same as the basic configuration of the SV 600, and thus descriptions of the SVs 700 to 900 are omitted. In addition, the number of VMs executed in the SVs 600 to 900 is arbitrary and is not limited to the number of VMs illustrated in FIG. 2.

A VM manager SV 1000 is connected to the SVs 600 to 900 and the BR 1100. The VM manager SV 1000 manages the creation of the VM 620, a VM 720, a VM 730, a VM 740, a VM 820, a VM 830, a VM 840, a VM 920, and a VM 930 in the SVs 600 to 900, which are physical servers, the elimination of these VMs from the physical servers, and the movement (migration) of these VMs among the physical servers. The VM manager SV 1000 includes a database (hereinafter abbreviated as "DB") 1010. The association between the MAC address and the Internet protocol (IP) address of each VM is stored as VM information in the DB 1010. The DB 1010 is implemented by a memory 3100 or a storage device 3200 described below. The VM manager SV 1000 has a function of notifying the BR 1100 of the VM information. The VM manager SV 1000 is not limited to having the function of management of each VM, and may have the function of management of the SVs 600 to 900, which are physical servers. For example, the VM manager SV 1000 may have functions of connecting the SVs 600 to 900 to the NW 400 and the NW 500, and disconnecting the SVs 600 to 900 from the NW 400 and the NW 500.

The BR 1100 is connected to the NW 400, the NW 500 and the SV 1000. The BR 1100 is an example relay device for relaying data and packets communicated between the NW 400 and the NW 500. The BR 1100 includes a DB 1110 and a DB 1120.

The DB 1110 is a database that stores associations between the MAC addresses and the IP addresses of the VMs in accordance with VM information sent from the VM manager SV 1000. Even if the BR 1100 does not receive VM information that includes associations between the MAC addresses and the IP addresses of VMs from the VM manager SV 1000, the BR 1100 is able to acquire MAC addresses and IP addresses included in the packets of an ARP request and an ARP reply when relaying the ARP request and the ARP reply, and therefore the BR 1100 may learn associations between the MAC addresses and the IP addresses by caching the acquired MAC addresses and IP addresses in the DB 1110. The BR 1100 may have a function of returning an ARP reply on behalf of the destination of an ARP request, based on the associations between the MAC addresses and the IP addresses stored in the DB 1110. The BR 1100 may have a function of for example, when receiving an ARP request, making an ARP reply to the source of the ARP request on behalf of the destination if the MAC address corresponding to the destination IP address is already in the DB 1110, without broadcasting the ARP request across the L2 network. This function is Proxy ARP. If an MAC address is already stored in the DB 1110, broadcasting of an ARP request decreases by virtue of Proxy ARP, which increases efficiency of the network.

The DB 1120 is a database that stores as communication information histories regarding which virtual machine or server has acquired the MAC address of which virtual machine or server as part of an ARP request. For example, the DB 1120 stores associations between the source MAC addresses and destination MAC addresses of ARP requests. As a result of coordination between the communication information stored in the DB 1120 and the VM information stored in the DB 1010 described above, a layer 3 (hereinafter referred to as "L3")-level packet is not sent to a VM disconnected from the network. This point will be described below. Communication at the L3 level uses transmission control protocol (TCP) and user datagram protocol (UDP), for example. The DB 1110 and DB 1120 described above are implemented by a memory 4100 or a storage device 4200 described below.

Figure 3:
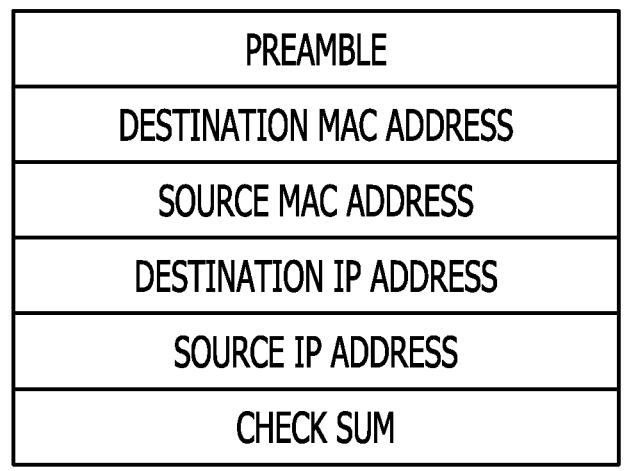
FIG. 3 illustrates an example ARP packet which is communicated in the information processing system to which the embodiment is applied.

FIG. 3 illustrates an example ARP packet which is communicated in an information processing system to which the embodiment is applied. The ARP packet includes at least a preamble, destination MAC address, source MAC address, destination IP address, source IP address, and check sum for error correction. The embodiment is not limited to the format of an ARP packet as illustrated in FIG. 3, and may include general information, such as a hardware type, other than the illustrated information.

By the way, with an ARP request, the destination MAC address is not specified in an ARP packet. When the VM or server to which the destination IP address specified in an ARP packet is assigned receives the ARP packet, the VM or server returns an ARP packet in which the source MAC address and IP address of the received ARP packet are set as the destination and the MAC address and IP address of the VM or server are set as the source, as an ARP reply. When the BR 1100 illustrated in FIG. 2 has a function of learning associations between MAC addresses and IP addresses, the BR 1100 stores the associations between the MAC addresses and the IP addresses in ARP packets used with ARP requests and ARP replies. An ARP packet is a packet used for acquisition of a MAC address and does not include data to be sent using communication at the L3 level between VMs or servers, and therefore an ARP packet is a packet of at most several bytes.

FIG. 4 illustrates example information which is stored in an ARP cache to which the embodiment is applied. For example, the ARP cache 630 illustrated in FIG. 2 stores (caches) the information illustrated in FIG. 4 for a fixed period of time. The information stored for a fixed period of time is information on associations between MAC addresses and IP addresses of other VMs or servers, and is information acquired by means of the VM 620 making ARP requests. Some of the associations between MAC addresses and IP addresses are obtained using information returned as ARP replies by VMs or servers, and others are associations between the MAC addresses and the IP addresses stored in the ARP cache 630 using information returned as ARP replies by the BR 1100 on behalf of the VMs or servers. The ARP cache in which associations between the MAC addresses and the IP addresses are stored is not limited to the ARP cache 630, and may be an ARP cache included in any of other SVs 700 to 900.

FIG. 5 illustrates example VM information which is stored in a management server to which the embodiment is applied. An example management server is the VM manager SV 1000 illustrated in FIG. 2. The VM information includes the MAC address and IP address of each VM managed by the VM manager SV 1000 and is stored in the DB 1010. The IP address 10.146.48.79 and the MAC address 00-90-27-AA-74-E0 are assigned to a VM with the VM number "1" by the VM manager SV 1000, for example.

FIG. 6 illustrates an example of information stored in a bridge (relay device) to which the embodiment is applied. An example of the bridge (relay device) is the BR 1100 illustrated in FIG. 2. The information illustrated in FIG. 6 is information about the association between the MAC addresses and the IP addresses assigned to a VM or server, and is stored in the DB 1110. The BR 1100 causes an association between the MAC address and the IP address assigned to each VM included in the data center 100 to be stored in the DB 1110, based on VM information (see FIG. 5) of which the BR 1100 is notified by the VM manager SV 1000. If the BR 1100 is not notified of VM information (see FIG. 5) by the VM manager SV 1000, the DB 1110 may learn an association between the MAC address and the IP address assigned to each VM based on the MAC address and IP address included in an ARP packet when relaying an ARP request or an ARP reply and store the association in the DB 1110, as mentioned above. FIG. 6 illustrates, for example, a VM with an IP address of "10.146.46.52" and a MAC address of 00-90-27-AA-74-E1.

FIG. 7 illustrates another example of information which is stored in the bridge (relay device) to which the embodiment is applied. The information illustrated in FIG. 7 is information stored in the DB 1120 included in the BR 1100, and is an example of communication information. The BR 1100 stores in the DB 1120 histories regarding which virtual machine or server has acquired the MAC address of which virtual machine or server on the occasion of an ARP request, as communication information. FIG. 7 illustrates, for example, that, on the occasion of an ARP request, a VM with the MAC address of 00-90-27-AA-74-E0 has acquired the MAC address of 00-90-27-AA-74-E1. In addition, ARP requests and replies are made between VMs, and therefore, in the case of the example illustrated in FIG. 7, the MAC address of 00-90-27-AA-74-E0 may be stored in the ARP cache of the VM with the MAC address of 00-90-27-AA-74-E1. However, when the BR 1100 acts as a proxy to make an ARP reply based on VM information, the MAC address of 00-90-27-AA-74-E0 may possibly not be stored in the ARP cache of the VM with the MAC address of 00-90-27-AA-74-E1 in some cases. Since a MAC address included in an ARP cache will be erased if the MAC address is not used for a fixed period of time, there are some cases where although an association between MAC addresses exists in the DB 1120, the MAC address has already been erased from the ARP cache of the concerned VM. Additionally, given that the communication information includes a combination of MAC addresses with which communication at the L3 level has been performed after the ARP request and the ARP reply, the communication information may include the case where communication at the L3 level has not been performed.

Figure 8:
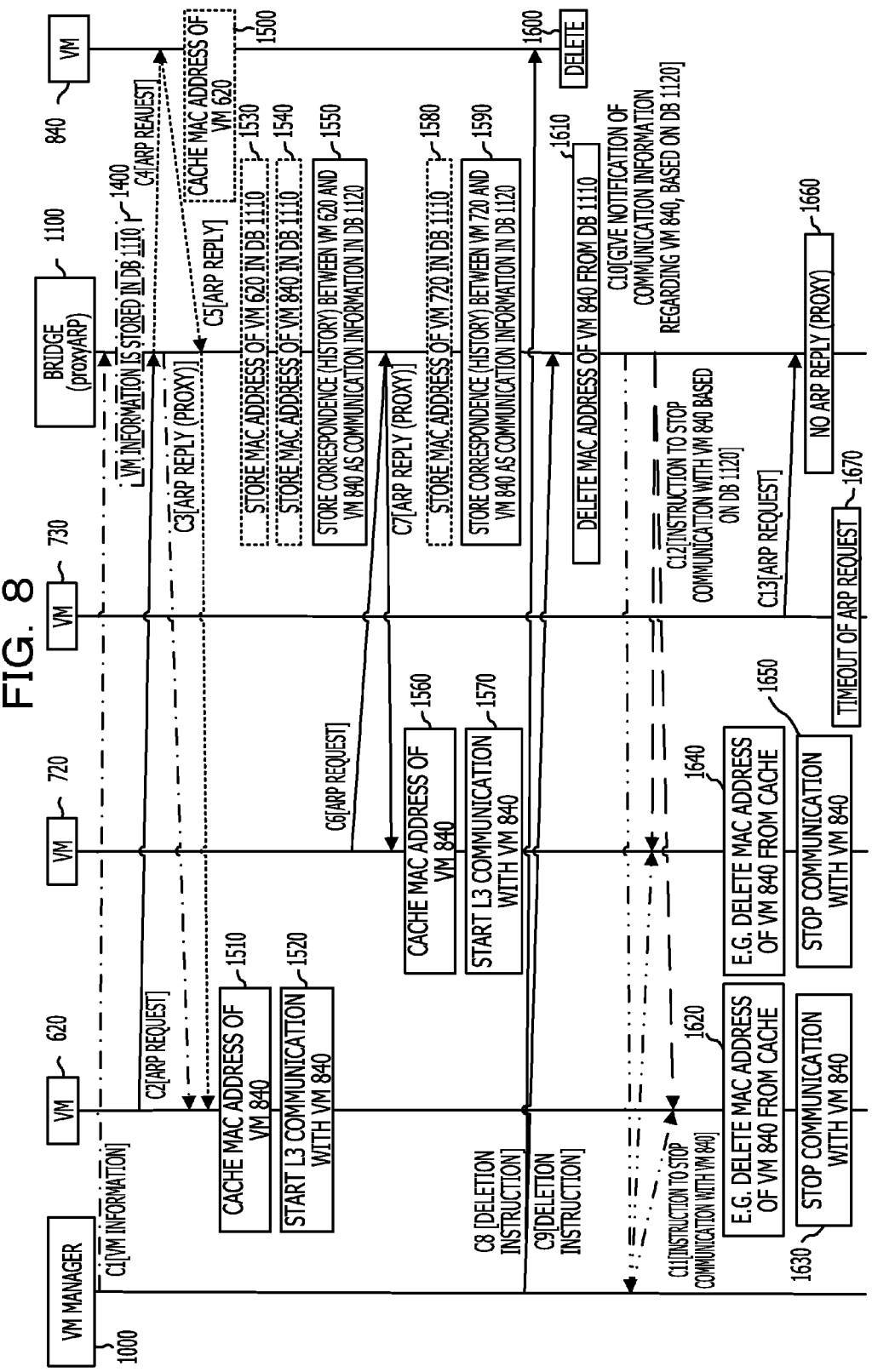
FIG. 8 illustrates an example of communication which occurs in the information processing system to which the embodiment is applied.

FIG. 8 illustrates an example of communication which occurs in the information processing system to which the embodiment is applied. Here, an example of the VM manager SV 1000, the VM 620, VM 720 and VM 730 which try to communicate with the VM 840, and the BR 1100 that relays communication from the VM 620, VM 720, VM 730, and VM 840 will now be described. In the example of FIG. 8, at least either notifications and processing indicated by dashed-dotted lines or notifications and processing indicated by dotted lines may be performed. Additionally, at least either notifications and processing indicated by a dashed double-dotted line or notifications and processing indicated by dashed lines may be performed.

As represented by notification C1 (dashed-dotted line), the BR 1100 is notified of VM information from the VM manager SV 1000. The VM information is about an association between the MAC address and the IP address of each VM, as illustrated in FIG. 5. Upon receipt of the VM information, the BR 1100 performs processing 1400 (dashed-dotted border) of storing the VM information in the DB 1110. As a result of the processing 1400, the association between the MAC address and the IP address of each VM in the VM information is stored in the DB 1110.

The VM 620 which has not yet acquired the MAC address of the VM 840 makes an ARP request with the destination IP address of the VM 840 in order to perform communication at the L3 level with the VM 840. As represented by notification C2, the BR 1100 is notified of the ARP request from the VM 620. If the BR 1100, which has received the ARP request of notification C2, has received the VM information through notification C1, the BR 1100 acts as a proxy to send the MAC address corresponding to the destination IP address included in the ARP request of notification C2 in accordance with the association between the MAC address and the IP address of each VM stored in the DB 1100, to the VM 620. This ARP reply (proxy) is indicated as notification C3 (dashed-dotted line). Through notification C3, the VM 620 acquires the MAC address of the VM 840. Otherwise, if the BR 1100, which has received the ARP request of notification C2, has not received the VM information through notification C1, the BR 1100 broadcasts an ARP request across the NW 500 as indicated by notification C4 (dotted line). The VM 840 receives the ARP request of notification C4. Since the destination IP address included in the ARP packet matches the address of the VM 840, the VM 840 makes an ARP reply, as indicated by notification C5 (dotted line), in order to notify the VM 620, which is the source, of the MAC address of the VM 840. The ARP reply of notification C5 is relayed by the BR 1100 and is delivered to the VM 620. Processing 1500 of storing the MAC address of the VM 620, which is included in the ARP packet in the ARP request of notification C4, in an ARP cache is performed by the VM 840.

Having received the ARP reply of notification C3 or the ARP reply of notification C5, the VM 620 performs processing 1510 in which the MAC address of the VM 840 included in the ARP packet is stored in the ARP cache 630. Based on the MAC address of the VM 840 stored in the ARP cache 630 and transmission data, communication at the L3 level with the VM 840 is performed by the VM 620.

The BR 1100 captures the MAC address of the VM 620 included in the ARP packet in the ARP request of notification C2, and thus performs processing 1530 (dotted border) in which the MAC address of the VM 620 is stored in the DB 1110. The BR 1100 captures the MAC address of the VM 840 included in the ARP packet in the ARP reply of notification C5, and thus performs processing 1540 (dotted border) in which the MAC address of the VM 840 is stored in the DB 1110. When processing 1400 indicated by a dashed-dotted line is performed, since the association between the MAC address and the IP address of each VM is stored in the DB 1110 of the BR 1100, processing 1530 and processing 1540 indicated by dotted borders may be omitted.

The BR 1100 determines, based on either the ARP request of notification C2 and the ARP reply of notification C3 or the ARP request of notification C2 and the ARP reply of notification C5, that the VM 620 tries to communicate with the VM 840, and performs processing 1550 in which the correspondence between the VM 620 and the VM 840 is stored as history of the communication in the DB 1120. As a result of processing 1550, the MAC address of the VM 620 and the MAC address of the VM 840 are associated with each other and are stored as communication information in the DB 1120. As a result of referencing the communication information, it is presumed that the MAC address of the VM 840 is cached in the ARP cache of the VM 620, and the MAC address of the VM 620 is cached in the ARP cache of the VM 840. However, when the BR 1100 acts as a proxy to perform the ARP reply of notification C3 based on VM information, since the ARP request of notification C2 is not sent to the VM 840, the VM 840 does not acquire the MAC address of the VM 620. That is, there may be cases where although the MAC address of the VM 620 and the MAC address of the VM 840 are associated with each other in communication information, the MAC address of the VM 620 is not cached in the ARP cache of the VM 840.

The VM 720, which has not acquired the MAC address of the VM 840, performs an ARP request with the destination IP address of the VM 840 in order to perform communication at the L3 level with the VM 840. As indicated by notification C6, the BR 1100 is notified of the ARP request from the VM 720. Since the BR 1100, which receives the ARP request of notification C6, has already received the association between the MAC address and the IP address of the VM 840 in processing 1400 or processing 1540, the BR 1100 acts as a proxy to send to the VM 720 the MAC address corresponding to the destination IP address included in the ARP packet of the ARP request of notification C6 in accordance with the association between the MAC address and the IP address of each VM stored in the DB 1110. This ARP reply (proxy) is notification C7.

The VM 720, which has received the ARP reply (proxy) of notification C7, performs processing 1560 in which the MAC address of the VM 840 included in the ARP packet is stored in the ARP cache. Communication at the L3 level with the VM 840 is performed by the VM 720 based on the MAC address of the VM 840 stored in the ARP cache of the VM 720 and transmission data.

When processing 1400 (dashed-dotted border) is not performed, the BR 1100, which has performed the ARP reply (proxy) of notification C7, captures the MAC address of the VM 720 included in the ARP packet in the ARP request of notification C6, and thus performs processing 1580 (dotted border) in which the MAC address of the VM 720 is stored in the DB 1110.

The BR 1100 determines, based on the ARP request of notification C6 and the ARP reply of notification C7, that the VM 720 tries to communicate with the VM 840, and performs processing 1590 in which the correspondence between the VM 720 and the VM 840 is stored as history in the DB 1120. As a result of the processing 1590, the MAC address of the VM 720 and the MAC address of the VM 840 are associated with each other and are stored as communication information in the DB 1120. As a result of referencing the communication information, it is presumed that the MAC address of the VM 840 is cached in the ARP cache of the VM 720, and the MAC address of the VM 720 is cached in the ARP cache of the VM 840. However, since based on VM information the BR 1100 acts as a proxy to perform the ARP reply by way of the notification C7, the VM 840 does not acquire the MAC address of the VM 720 in this example.

The VM manager SV 1000 notifies the VM 840 of a deletion instruction by, as indicated by notification C8. The VM 840, after receiving the deletion instruction of notification C8, is deleted from the physical server 900 in deletion processing 1600.

For example, assume that the VM 620, the VM 720, and the VM 730 are virtual machines in which an application is executed, and the VM 804 provides an update file for the application. After the VM 840 provides the update file to the VM 620 and the VM 720, the VM 840 may be abruptly deleted in some cases for reasons such as detecting a defect in the update file. For example, a deletion instruction (C8) is an instruction for deletion of the VM 840. The present disclosure is not limited to this illustrative example.

If the VM manager SV 1000 notifies the VM 840 of a deletion instruction of notification C8, the VM manager SV 1000 gives a deletion notification to the BR 1100 as indicated by notification C9. Processing 1610 of deleting the MAC address of the VM 840 from the DB 1100 is performed by the BR 1100 which has received the deletion notification of notification C9. As a result of processing 1610, the BR 1100 does not perform a proxy reply to the ARP request with the destination of the VM 840. Accordingly, there is no case where the MAC address of the VM 840 is notified on behalf of the VM 840 even though the VM 840 has been deleted. Therefore, starting communication with the VM 840 which has already been deleted is inhibited. This inhibits a needless packet from being sent to a network.

Although the example of FIG. 8 is an example in which the VM 840 is deleted, a deletion notification from notification C9 is not given to the BR 1100 promptly after the deletion of the VM 840—notifications to notify the BR 1100 of deletion of a plurality of VMs which have not been deleted simultaneously may be collectively given to the BR 1100. In this case, network bandwidth is not occupied by a deletion notification each time a VM is deleted. For example, based on a network communication situation, the VM manager SV 1000 may give deletion notification of a plurality of VMs which have not been simultaneously deleted to the BR 1100 in a period when the network is not congested.

Upon receiving the deletion notification of notification C9 and based on the DB 1120, the BR 1100 notifies the VM manager SV 1000 of communication information about the VM 840, as indicated by notification C10 (dashed double-dotted line). For example, from the deletion notification of notification C9, the BR 1100 detects that the VM 840 is to be deleted. Then, in order to notify the VM manager SV 1000 of a virtual machine in which it is presumed that the MAC address of the VM 840 is stored in the ARP cache, the BR 1100 extracts the MAC address of the virtual machine associated with the VM 840 from the DB 1120 and notifies the VM manager SV 1000 of the extracted MAC address as notification information.

The VM manager SV 1000 which has received the communication information indicated by notification C10 determines, based on the communication information, that virtual machines which store the MAC address of the VM 840 in their ARP caches are the VM 620 and the VM 720, and notifies the VM 620 and the VM 720 of a communication stop instruction to stop communication with the VM 840, as indicated by notification C11 (dashed double-dotted line). Processing 1620 in which the MAC address of the VM 840 is deleted from the ARP cache 630, for example, is performed by the VM 620, which has received the communication stop instruction of notification C11. Then, the VM 620 performs processing 1630 of stopping communication with the VM 840. Additionally, the VM 720 which has received the communication stop instruction of notification C11 performs processing 1640 in which the MAC address of the VM 840 is deleted from an ARP cache, for example. Then, the VM 720 performs processing 1650 of stopping communication with the VM 840. Since a VM in which the MAC address of a deleted VM is assumed to be stored in the ARP cache is identified based on communication information and a communication stop instruction is sent to the identified VM, it is unnecessary to send communication stop instructions to all the VMs managed by the VM manager SV 1000, and thus the efficiency of network bandwidth utilization does not decrease.

Even if the MAC address of the VM 840 is not deleted from the ARP caches of the VM 620 and the VM 720, the VM 620 and the VM 720 may be inhibited from starting communication at the L3 level with the VM 840. For example, even if the MAC address of the VM 840 remains stored in the ARP caches of the VM 620 and the VM 720, the VM 620 and the VM 720 may inhibit generation of an L3-level packet toward the VM 840, and may inhibit sending of an L3-level packet even if the packet is generated. For example, even if the MAC address of the VM 840 remains stored in the ARP caches of the VM 620 and the VM 720, starting communication at the L3 level with the VM 840 may be inhibited by using a flag which disables packet generation and packet sending. As described below, thanks to the above processing, an L3-level packet may possibly not be missent to a virtual machine which has been deleted.

By the way, if the VM manager SV 1000 does not notify the VM 620 and the VM 720 of communication stop instructions based on notification C10 (dashed double-dotted line) and notification C11 (dashed double-dotted line), the BR 1100 may notify the VM 620 and the VM 720 of communication stop instructions, as indicated by notification C12 (dashed line). Even in this case, as described above, since a VM in which the MAC address of a deleted VM is assumed to be stored in the ARP cache is identified based on communication information and a communication stop instruction is sent to the identified VM, it is unnecessary to send communication stop instructions to all the VMs managed by the VM manager SV 1000, and thus the efficiency of network bandwidth utilization does not decrease. Additionally, even in this case, as described above, even if the MAC address of the VM 840 is not deleted from the ARP caches of the VM 620 and the VM 720, the VM 620 and the VM 720 may be inhibited from starting communication at the L3 level with the VM 840. For example, even if the MAC address of the VM 840 remains stored in the ARP caches of the VM 620 and the VM 720, the VM 620 and the VM 720 may be inhibited from generating an L3-level packet to be sent to the VM 840, and may also be inhibited from sending of an L3-level packet even if the packet is generated. For example, even if the MAC address of the VM 840 remains stored in the ARP caches of the VM 620 and the VM 720, starting communication at the L3 level with the VM 840 may be inhibited by using a flag which disables packet generation and packet sending.

The VM 730 which has not yet acquired the MAC address of the VM 840 makes an ARP request with the destination IP address of the VM 840, as indicated by notification C13, in order to perform communication at the L3 level with the VM 840. The BR 1100 receives the ARP request of notification C13. However, since the MAC address of the VM 840 is deleted from the DB 1110 in processing 1610 and there is no IP address corresponding to the VM 840 in a network connected to the BR 1100, the BR 1100 does not make the subsequent ARP request and proxy ARP reply. After a given period of time, the VM 730 which has not been able to receive an ARP reply determines that the ARP request has timed out. That is, the VM 730 is not able to establish communication with the VM 840.

Figure 9:
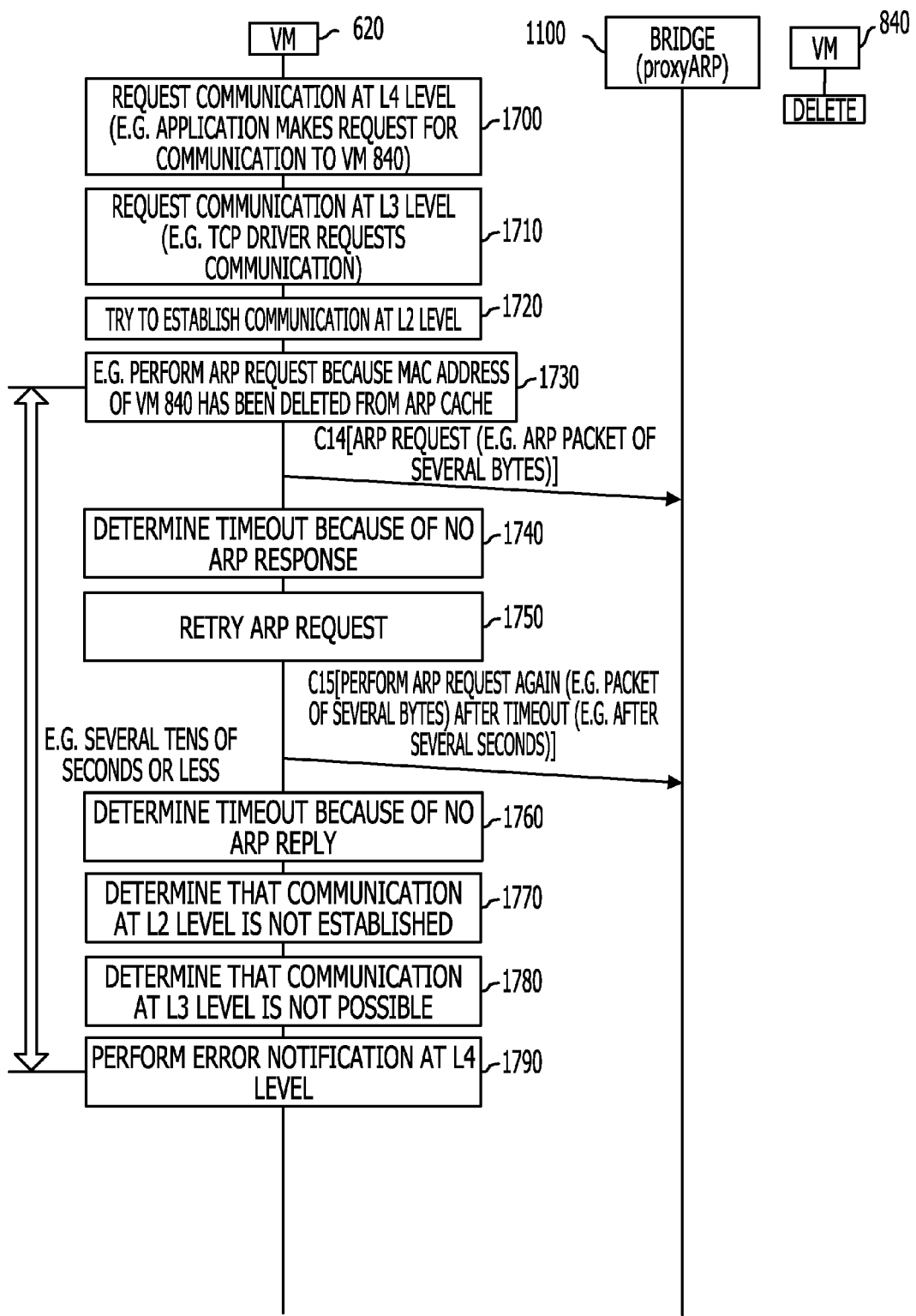
FIG. 9 illustrates another example of communication which occurs in the information processing system to which the embodiment is applied.

FIG. 9 illustrates another example of communication which occurs in the information processing system to which the embodiment is applied. Here, the VM 840 is deleted by the VM manager SV 1000 in the example of communication illustrated in FIG. 8, and, an example in which, after the MAC address of the VM 840 is erased from the ARP cache 630 of the VM 620, the VM 620 tries to communicate with the VM 840 once more, for example, is illustrated.

In the VM 620, processing 1700 of making a request for communication at a layer 4 (hereinafter referred to as "L4") level is performed. For example, in processing 1700, a request for communication is made by the application layer in the VM 620. Upon receipt of the request for communication at the L4 level, processing 1710, which requests for communication at the L3 level, is performed. For example, a transmission control protocol (TCP) driver implemented in the VM 620 makes a request for communication. Upon receipt of the request of communication at the L3 level, processing 1720, which tries to establish communication at the L2 level, is performed. Since the MAC address of the VM 840 is deleted from the ARP cache 630 of the VM 620 as a result of processing 1620 illustrated in FIG. 8, the VM 620 performs processing 1730, which performs an ARP request to acquire the MAC address of the VM 840, in order to establish communication at the L2 level. As a result of processing 1730, as indicated by notification C14, an ARP packet of several bytes as illustrated in FIG. 3 is sent as an ARP request to the BR 1100. In the BR 1100, however, the MAC address of the VM 840 has been deleted from the DB 1110 in processing 1610 illustrated in FIG. 8, and it is determined that a VM corresponding to the destination IP address included in the ARP packet is not connected to the NW 500. Therefore, an ARP reply is not returned to the VM 620. Since an ARP reply is not returned within a fixed period of time (for example, within several seconds), processing 1740, which determines that the ARP request timed out, is performed in the VM 620. After the processing 1740 is performed processing 1750, which retries an ARP request is performed. As a result of processing 1750, as indicated by notification C15, an ARP packet of several bytes as illustrated in FIG. 3 is resent as an ARP request to the BR 1100. However, the VM 840 has been deleted from the network, and therefore an ARP reply does not return to the VM 620 as mentioned above. Accordingly, in the VM 620, processing 1760, which determines that the ARP request has timed out again, is performed. The ARP request results in a failure, and therefore, in the VM 620, processing 1770, which determines that communication with the VM 840 has not been established, is performed. In response to the result of processing 1770, in the VM 620, processing 1780, which determines that communication at the L3 level is not possible, is performed, and processing 1790 in which an error notification is given at the L4 level is performed.

An ARP request is processing at the L2 level, and if communication is not established at the L2 level, communication at the L3 level will not be performed. Therefore, the timeout period for an ARP request is generally set to be relatively short (several seconds). That is, the timeout period for an ARP request is set to be shorter than the timeout period of processing at the L3 level. Generally, the number of retries at the L2 level is set to be less than the number of retries at the L3 level. Accordingly, the time taken until the failure of an ARP request illustrated in FIG. 9 is at most several tens of seconds. Additionally, transmission data to be sent at the L3 level is not included in an ARP packet, and therefore an ARP packet is generally a packet of several bytes. That is, an ARP packet is smaller in size than an L3-level packet.

Figure 10:
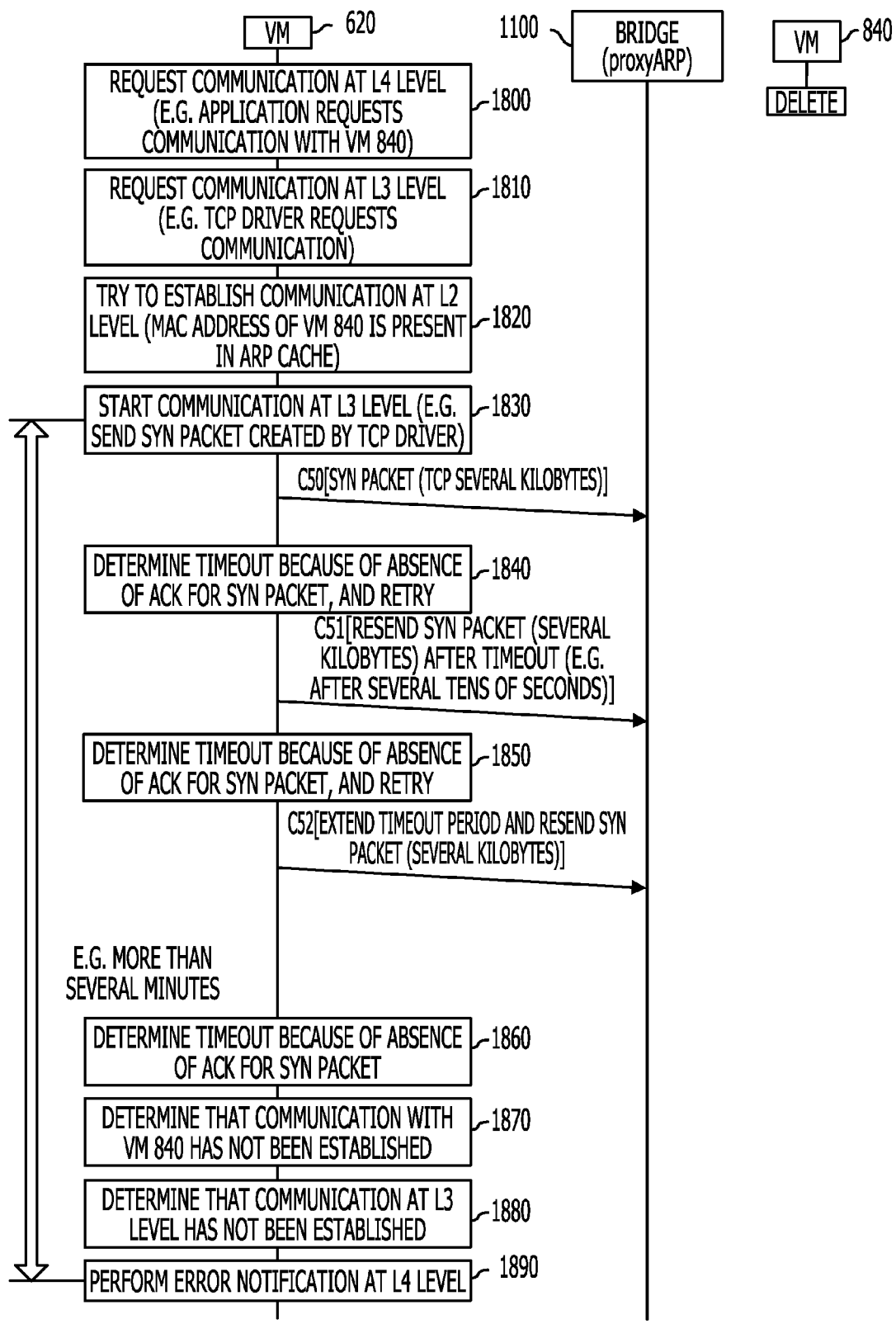
FIG. 10 illustrates an example of communication compared to the information processing system to which the embodiment is applied.

FIG. 10 illustrates an example of communication as compared to the information processing system to which the embodiment is applied. Here, an example is displayed wherein, although the VM 840 has been deleted by the VM manager SV 1000, the MAC address of the VM 840 has not been erased from the VM 620, and the VM 620 tries to perform communication at the L3 level with the VM 840. From the example illustrated in FIG. 10, problems which inventors have newly uncovered are also explained.

In the VM 620, processing 1800 of making a request for communication at the L4 level is performed. For example, in processing 1800, a request for communication is made by the application layer in the VM 620. Upon receipt of the request for communication at the L4 level, processing 1810 of making a request for communication at the L3 level is performed. For example, a TCP driver that has been implemented in the VM 620 makes a request for communication. Upon receipt of the request of communication at the L3 level, processing 1820 of trying to establish communication at the L2 level is performed. Although the VM 840 has been deleted by the VM manager SV 1000, the MAC address of the VM 840 has not been deleted from the ARP cache 630 of the VM 620. Therefore, in the VM 620, processing 1830 of starting communication at the L3 level is performed. For example, as indicated by notification C50, a synchronization (SYN) packet (a packet for establishing communication at the L3 level with the VM 840) created by the TCP driver implemented in the VM 620 is sent to the BR 1100. The SYN packet, which is an L3-level packet, is a packet of several kilobytes. The VM 620 waits with the expectation that the VM 840 would return an acknowledgement (ACK) packet for the SYN packet. However, since the VM 840 has been deleted by the VM manager SV 1000, the VM 840 does not exist in the network and an ACK packet will not be returned. Accordingly, the VM 620 determines a timeout because there is no ACK packet for the SYN packet, and processing 1840 in which sending of a SYN packet is retried is performed. As a result of processing 1840, a SYN packet is resent as indicated by notification C51. The timeout period for receipt of an ACK packet for a SYN packet is set to several tens of seconds. The timeout period that is set again when establishment of communication is retried is longer than the initial timeout period. For example, the timeout period is doubled each time establishment of communication is retried. The number of retries in this case is set to be larger than the number of retries for establishing communication at the L2 level. The reason for this is as follows. It is determined that the fact that communication at the L3 level has started ensures that communication at the L2 level has already been established. That is, there is a design concept that since communication at the L2 level has been established, retrying communication at the L3 level would lead to the establishment of communication in time. However, in the example of FIG. 10, since the VM 840 does not exist in the network, an ACK packet is not sent as a reply to resending of the SYN packet of notification C51. The VM 620 determines a timeout again because of the absence of an ACK packet for the resent SYN packet, and processing 1850 that makes a retry again is performed. As a result of processing 1850, as indicated by notification C52, a SYN packet is resent under the condition that the timeout period is extended. Even though the SYN packet is resent under the condition that the timeout period is extended in processing 1850, an ACK packet does not return, and therefore, in the VM 620, processing 1860 in which a timeout is determined again is performed. In the VM 620, since communication at the L3 level results in a failure, processing 1870 of determining that communication with the VM 840 has not been established is performed. In response to the result of processing 1870, in the VM 620, processing 1880 of determining that communication at the L3 level is not possible is performed, and processing 1890 in which an error notification is given at the L4 level is performed.

As described above, communication at the L3 level is retried with the determination that communication with the counterparty has already been established at the L2 level. Therefore, the timeout period is set to be longer than the timeout period of communication at the L2 level, and the number of retries is set to be larger than the number of retries of communication at the L2 level. Accordingly, in contrast to the time of several tens of seconds which is taken until an error notification illustrated in FIG. 9 is given, the time taken until an error notification illustrated in FIG. 10 is given is several minutes or more. Furthermore, actual data is included in an L3-level packet and therefore the size of the L3-level packet is several kilobytes. A problem arises in that such an L3-level packet continues to be sent over a network for several minutes or more despite the fact that the virtual machine to which the packet is destined does not exist.

The inventors have newly found out these problems. As in the embodiment, when the VM 840 is deleted, the MAC address of the VM 840 is also deleted from an ARP cache corresponding to a VM, and thus communication at the L3 level is inhibited. That is, the L3-level packet is inhibited from being sent to a network, and the time taken until an error notification is given is decreased.

Assume that, for example, several thousands of virtual machines are executed in one physical server. Each of the several thousands of virtual machines of a user A (company A) continues to send an L3-level packet of several kilobytes to a virtual machine which has been disconnected from the network by the VM manager SV 1000, thereby imposing a heavy load on the network.

Additionally, not all of the several thousands of virtual machines are used by the same user (business person), and it is assumed that virtual machines used by a plurality of users (business persons) are deployed and coexist in one physical server. For example, assume that several hundreds of virtual machines used by one user B (business person B) and several hundreds of virtual machines used by another user C (business person C) are deployed and coexist in one physical server. The user B and the user C share the physical server and connection to a network. Therefore, if the user B continues to send an L3-level packet even though a virtual machine to which the packet is destined does not exist, the efficiency at which the user C accesses the network may markedly decrease. That is, unnecessary packet sending by the user B narrows the transmission bandwidth of the user C, which reduces the performance of the user C. Furthermore, the reduction in the performance of the user C is not limited to a reduction in the speed of transmission to the network. The user B and the user C share the same physical server resources. Therefore, when mediation processing between virtual machines is performed, for example, resources to be assigned to the mediation processing relatively decreases because of unnecessary packet sending by the user B, and therefore performance for both the user B and the user C in the physical server may decrease.

As described above, when a service in which a plurality of users (business persons) share one physical server is provided, the effect of the embodiment, which may inhibit unnecessary sending of an L3 packet, becomes even more marked. Additionally, according to the embodiment, since, based on communication information, a VM in which the MAC address of a deleted VM is assumed to be stored in the ARP cache is identified and a communication stop instruction is sent to the identified VM, it is unnecessary to send communication stop instructions to all the VMs managed by the VM manager SV 1000, and thus the efficiency of network bandwidth utilization does not decrease. This effect becomes more marked if the number of VMs increases.

Figure 11:
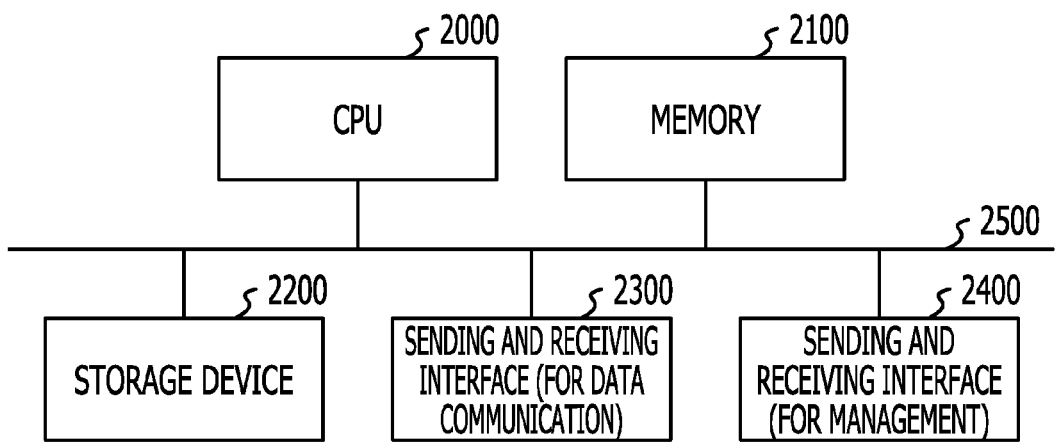
FIG. 11 illustrates a hardware configuration of a server to which the embodiment is applied.

FIG. 11 illustrates a hardware configuration of each server (SVs 600 to 900) to which the embodiment is applied. Each of the SVs 600 to 900 is a computer that includes a CPU 2000, a memory 2100, a storage device 2200, a transceiving interface (for data communications) 2300, a transceiving interface (for management) 2400, and a bus 2500 to which these components are connected. The CPU 2000 includes one or more processors for performing processing. The memory 2100 is, for example, a random access memory (RAM). The storage device 2200 is, for example, a nonvolatile memory, such as a read only memory (ROM) or a flash memory, or a magnetic disk unit, such as a hard disk drive (HDD). The transceiving interface (for data communication) 2300 is an interface for sending and receiving data to and from an external device, and is a circuit such as an interface circuit, a communication circuit, a communication control circuit, or a network interface card. The transceiving interface (for management) 2400 is an interface for sending and receiving data for management, and is a circuit such as an interface circuit, a communication circuit, a communication control circuit, or a network interface card. Programs in which processing for controlling actions of the SVs 600 to 900 is written and programs in which a process illustrated in FIG. 13 is written are stored in the memory 2100. The programs stored in the memory 2100, when executed by the CPU 2000, control the actions of the SVs 600 to 900 so that the SVs 600 to 900 function as functional blocks illustrated in FIG. 12.

Figure 12:
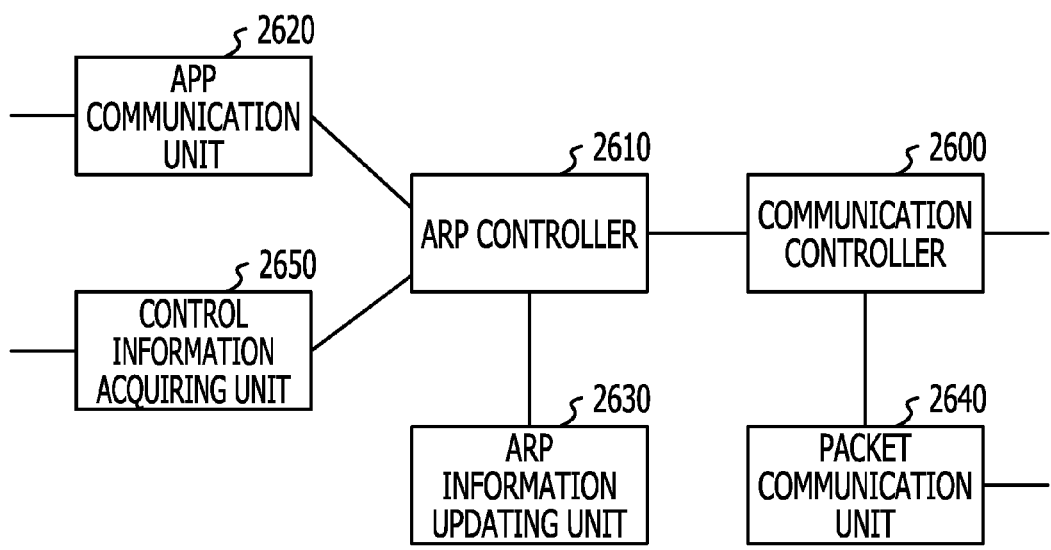
FIG. 12 illustrates functional blocks performed in the server to which the embodiment is applied.
Figure 13:
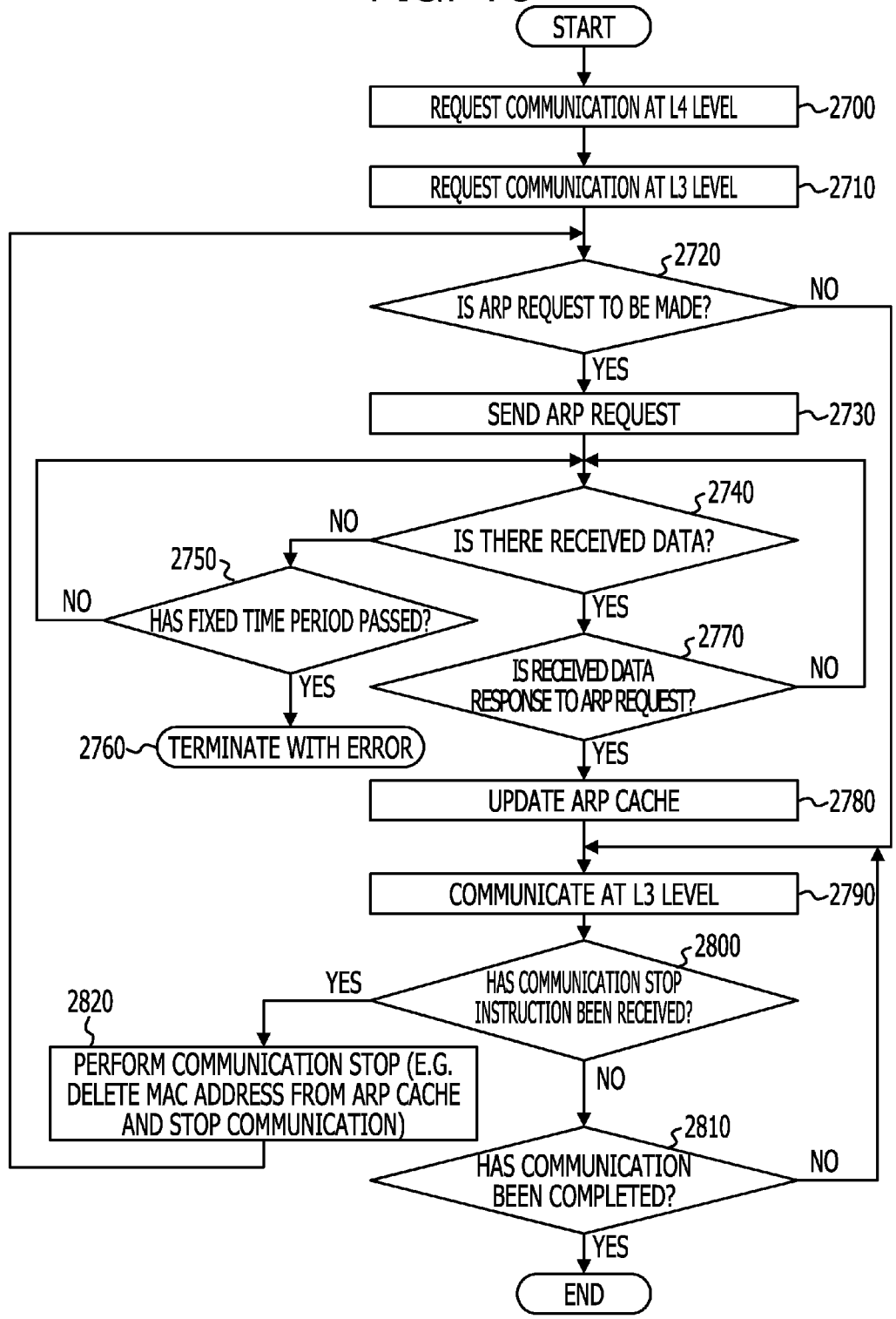
FIG. 13 illustrates a process performed in the server to which the embodiment is applied.

FIG. 12 illustrates functional blocks performed in the servers (the SVs 600 to 900) to which the embodiment is applied. The programs stored in the memory 2100 are executed by the CPU 2000, and, as a result, each of the SVs 600 to 900 functions as a communication controller 2600, an ARP controller 2610, an ARP communication unit 2620, an ARP information updating unit 2630, a packet communication unit 2640 and a control information acquiring unit 2650.

Processing performed by each functional block will be described below in such a way that the processing corresponds to a process illustrated in FIG. 13.

FIG. 13 illustrates a process performed in the servers (the SVs 600 to 900) to which the embodiment is applied. Processing 2700 of making a request for communication at the L4 level is performed by the communication controller 2600 of the virtual machine included in each of the SVs 600 to 900. Processing 2700 of making a request for communication at the L4 level is processing in which a request for communication is made by the application layer of a virtual machine, for example, and processing 1700 mentioned above is an example thereof. Processing 2710 of making a request for communication at the L3 level is performed by the communication controller 2600. Processing 2710 of making a request for communication at the L3 level is processing in which the implemented TCP driver makes a request for communication, for example, and processing 1710 mentioned above is an example thereof.

When a request for communication at the L3 level is made, the ARP controller 2610 performs processing 2720 of determining whether an ARP request is to be made. For example, the ARP controller 2610 determines whether the MAC address associated with the destination IP address specified in processing 2710 is present in an ARP cache stored in the memory 2100, and the process proceeds to processing 2730 if the MAC address is absent in the ARP cache whereas the process proceeds to processing 2790 if the MAC address is present in the ARP cache.

If, in processing 2720, it is determined that an ARP request is to be made, the ARP communication unit 2620 performs processing 2730 of sending an ARP request. An example of the ARP packet sent by the ARP communication unit 2620 is the example of a packet configuration illustrated in FIG. 3. Some of the examples of processing 2730 of sending an ARP request are notifications C2, C6, and C13 illustrated in FIG. 8.

Processing 2740 of determining whether received data is present is performed by the virtual machine included in each of the SV 600 to 900. If it is determined that received data is absent, then the ARP controller 2610 performs processing 2750 of determining whether a fixed period of time has passed. If it is determined that the fixed time period has passed, the process returns to processing 2740, whereas if it is determined that the fixed time has passed, it is determined that an ARP reply for the ARP request has not been made, and then processing 2760 in which the process terminates with an error is performed.

In processing 2740, if it is determined that the received data is present, then the ARP controller 2610 performs processing 2770 of determining whether the received data is a reply for the ARP request. If it is determined that the received data is not a reply for the ARP request, the process returns to processing 2740.

If, in processing 2770, it is determined that the received data is a reply to the ARP request, then the ARP information updating unit 2630 performs processing 2780 of updating the ARP cache. For example, the ARP information updating unit 2630 stores the MAC address acquired from the packet of an ARP reply in association with the IP address, as information illustrated in FIG. 4, in the memory 2100. Some of the examples of processing 2780 are processing 1510 and processing 1560 illustrated in FIG. 8.

When the MAC address of the destination has been acquired in processing 2770, processing 2790 of performing communication at the L3 level is performed. In processing 2790, since the destination MAC address is stored in the ARP cache, the communication controller 2600 is notified by the ARP controller 2610 that communication at the L2 level with the destination VM has been established. The communication controller 2600 which has received this notification causes the packet communication unit 2640 to generate an L3-level packet based on the destination MAC address stored in the ARP cache and transmission data, and send the packet to the destination. Some of the examples of processing 2790 are processing 1520 and processing 1570 illustrated in FIG. 8.

The control information acquiring unit 2650 performs processing 2800 of determining whether a VM deletion instruction is present. If it is determined that a VM deletion instruction is absent, the communication controller 2600 performs processing 2810 of determining whether communication has been completed. If it is determined that communication has not been completed, the process proceeds to processing 2790, where the process ends if it is determined that communication has been completed.

In processing 2800, if it is determined that a VM deletion instruction is present, for example, the ARP information updating unit 2630 performs processing 2820 of deleting the MAC address of a VM identified by the deletion notification from the ARP cache, and then the process proceeds to processing 2720. Some of the examples of processing 2820 are processing 1620 and processing 1640 illustrated in FIG. 8. One example of processing 2720 subsequent to processing 2820 corresponds to the process illustrated in FIG. 9. Although described above, even if the MAC address of the VM identified by the deletion notification is not deleted, starting communication at the L3 level may be inhibited. For example, even if the MAC address of the VM identified by the deletion notification remains stored in the ARP cache, generation of an L3-level packet may be inhibited, and sending of an L3-level packet may also be inhibited even if the packet is generated. For example, even if the MAC address of the VM identified by the deletion notification remains stored in the ARP cache, starting communication at the L3 level with the identified VM may be inhibited by using a flag which disables packet generation and packet sending. By means of the above processing, a L3-level packet may possibly not be missent to a virtual machine which has been deleted.

Figure 14:
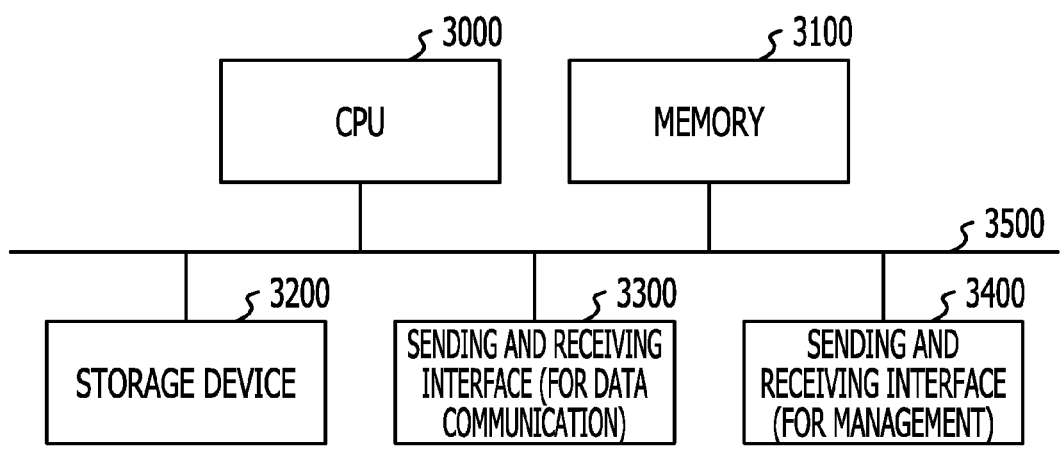
FIG. 14 illustrates a hardware configuration of a management server to which the embodiment is applied.

FIG. 14 illustrates a hardware configuration of a management server (the VM manager SV 1000) to which the embodiment is applied. The VM manager SV 1000 is a computer that includes a CPU 3000, a memory 3100, a storage device 3200, a transceiving interface (for data communications) 3300, a transceiving interface (for management) 3400, and a bus 3500 to which these components are connected. The CPU 3000 includes one or more processors for performing processing. The memory 3100 is, for example, a RAM. The storage device 3200 is, for example, a nonvolatile memory, such as a ROM or a flash memory, or a magnetic disk, such as an HDD. The transceiving interface (for data communication) 3300 is an interface for sending and receiving data to and from an external device, and is a circuit such as an interface circuit, a communication circuit, a communication control circuit, or a network interface card. The transceiving interface (for management) 3400 is an interface for sending and receiving data for management, and is a circuit such as an interface circuit, a communication circuit, a communication control circuit, or a network interface card. The memory stores both programs in which processing for controlling actions of the VM manager SV 1000 is written and programs in which a process illustrated in FIG. 16 is written. The programs stored in the memory 3100, when executed by the CPU 3000, control the actions of the VM manager SV 1000 such that the VM manager SV 1000 functions as functional blocks illustrated in FIG. 15.

Figure 15:
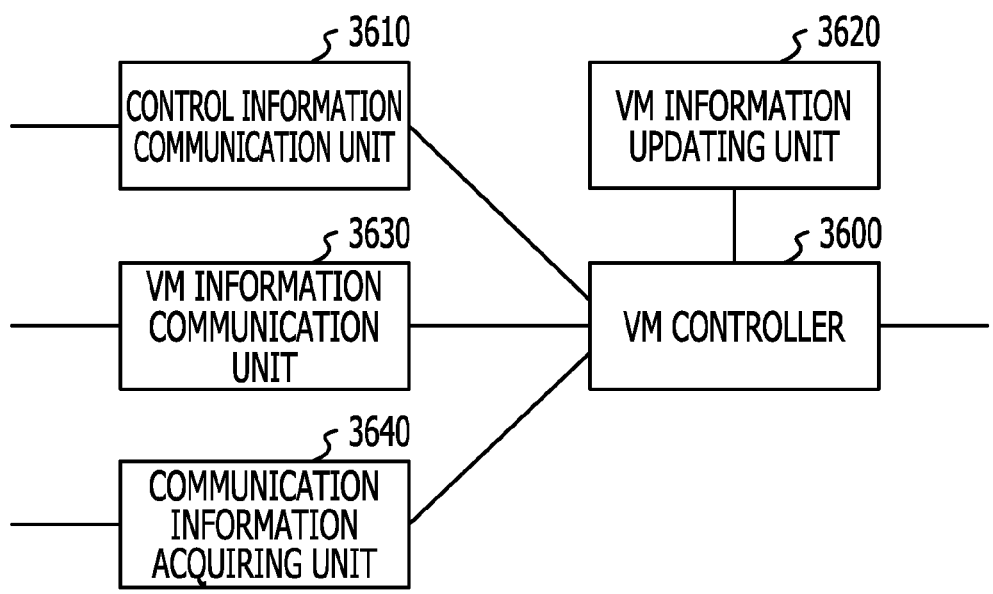
FIG. 15 illustrates functional blocks performed in the management server to which the embodiment is applied.
Figure 16:
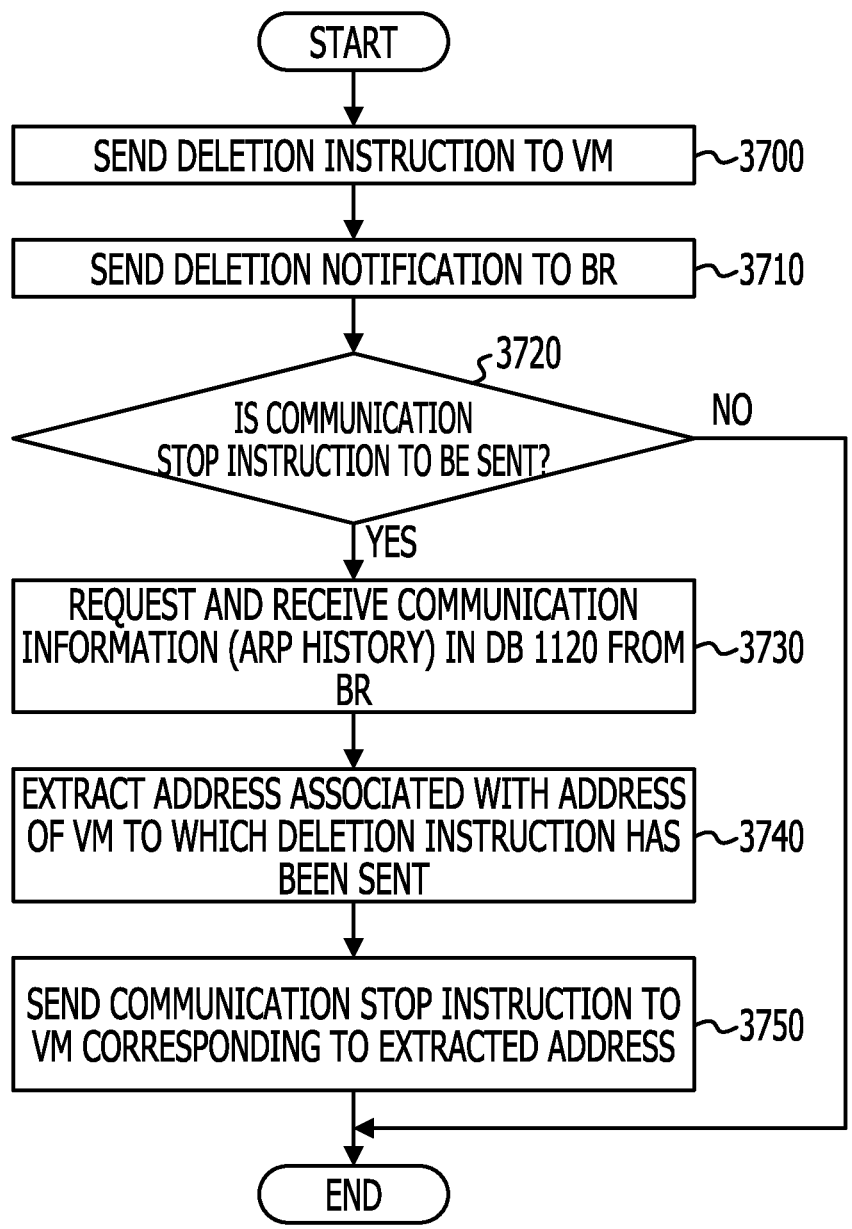
FIG. 16 illustrates a process performed in the management server to which the embodiment is applied.

FIG. 15 illustrates functional blocks performed in the management server (the VM manager SV 1000) to which the embodiment is applied. The programs stored in the memory 3100 are executed by the CPU 3000, and, as a result, the VM manager SV 1000 functions as a VM controller 3600, a control information communication unit 3610, a VM information updating unit 3620, a VM information communication unit 3630 and a communication information acquiring unit 3640. Processing performed by each functional block will be described below in such a way that the processing corresponds to a process illustrated in FIG. 16.

FIG. 16 illustrates a process performed in the VM manager SV 1000 to which the embodiment is applied. Processing 3700 of sending a deletion instruction to a VM is performed. In processing 3700, the VM controller 3600 identifies a VM to be deleted, and the control information communication unit 3610 sends a deletion instruction the identified VM. At this point, the VM information updating unit 3620 performs processing to delete both the MAC address and the IP address of the deleted VM from VM information stored in the memory 3100. An example of the deletion instruction sent in processing 3700 is notification C8 illustrated in FIG. 8.

Processing 3710 of sending a deletion notification to the BR 1100 is performed by the VM information communication unit 3630. As a result of processing 3710, data, such as the MAC address and IP address of the VM to be deleted, is sent as information identifying the VM to be deleted. Although described below, this deletion notification is acquired by a VM information acquiring unit 4640 included in the BR 1100. Thereby, in close cooperation with communication information of the DB 1120, the deletion notification identifies a VM to which a communication stop instruction is to be sent. An example of the deletion instruction sent in processing 3710 is notification C9 illustrated in FIG. 8.

Processing 3720 of determining whether to send a communication stop instruction to VMs other than the VM to which the deletion instruction has been sent is performed by the VM controller 3600. In processing 3720, if it is determined that a communication stop instruction is not to be sent to other VMs, the process terminates. In processing 3720, if it is determined that a communication stop instruction is to be sent to other VMs, the process proceeds to processing 3730.

Processing 3730 in which the VM controller 3600 requests the BR 1100 to provide communication information and the communication information is received by the communication information acquiring unit 3640 is performed. The communication information is information illustrated in FIG. 7, for example, and is information indicating which virtual machine may have acquired the MAC address of which virtual machine. As a result of processing 3730, the VM manager SV 1000 stores the communication information in the memory 3100. An example of receipt of the communication information in processing 3730 is notification C10 illustrated in FIG. 8.

Processing 3740 in which an address associated with the address of the VM to which a deletion instruction has been sent is extracted based on the communication information is performed by the VM controller 3600. Since the communication information indicates which virtual machine may have acquired the MAC address of which virtual machine, it is presumed that the MAC address of the deleted VM may be stored in the ARP cache of a VM having an address associated with the address of the VM to which deletion instruction has been sent, as described above. That is, as a result of processing 3740, a VM, in which the MAC address of the VM to which a deletion instruction has been sent and may be stored in the ARP cache, is specified, and the VM to which a VM deletion instruction is to be sent is extracted Processing 3750 in which a communication stop instruction is sent to a VM corresponding to the address extracted in processing 3740 is performed by the control information communication unit 3610. An example of the communication stop instruction is notification C11 illustrated in FIG. 8. The communication stop instruction sent in processing 3750 is an instruction to inhibit a VM corresponding to the extracted address from sending an L3-level packet to the deleted VM. In a VM which has received the communication stop instruction, the MAC address is deleted from the ARP cache, generation or sending of a packet is inhibited by using a flag, and a state in which generation or sending of a packet is inhibited is brought about, as mentioned above. When the communication stop instruction has been sent as a result of processing 3750, the process ends.

Figure 17:
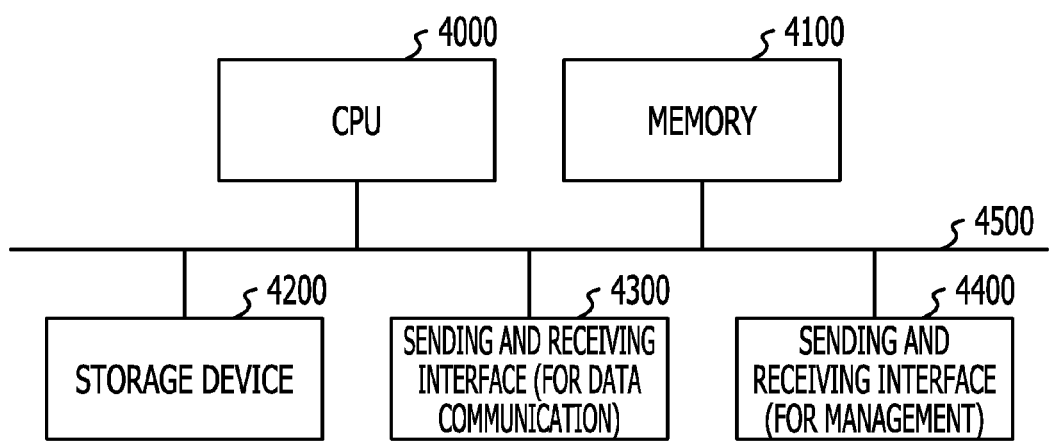
FIG. 17 illustrates a hardware configuration of a bridge (relay device) to which the embodiment is applied.

FIG. 17 illustrates a hardware configuration of a bridge (the BR 1100) to which the embodiment is applied. The BR 1100 is a computer including a CPU 4000, a memory 4100, a storage device 4200, a transceiving interface (for data communications) 4300, a transceiving interface (for management) 4400, and a bus 4500 to which these components are connected. The CPU 4000 includes one or more processors for performing processing. The memory 4100 is, for example, a RAM. The storage device 4200 is, for example, a nonvolatile memory, such as a ROM or a flash memory, or a magnetic disk device, such as an HDD. The transceiving interface (for data communication) 4300 is an interface for sending and receiving data to and from an external device, and is a circuit such as an interface circuit, a communication circuit, a communication control circuit, or a network interface card. The transceiving interface (for management) 4400 is an interface for sending and receiving data for management, and is a circuit such as an interface circuit, a communication circuit, a communication control circuit, or a network interface card. Programs in which processing for controlling actions of the BR 1100 is written and programs, in which a process illustrated in FIG. 19 is written, are stored in the memory 4100. The programs stored in the memory 4100, when executed by the CPU 3000, control the actions of the BR 1100 so that the BR 1100 functions as functional blocks illustrated in FIG. 18.

Figure 18:
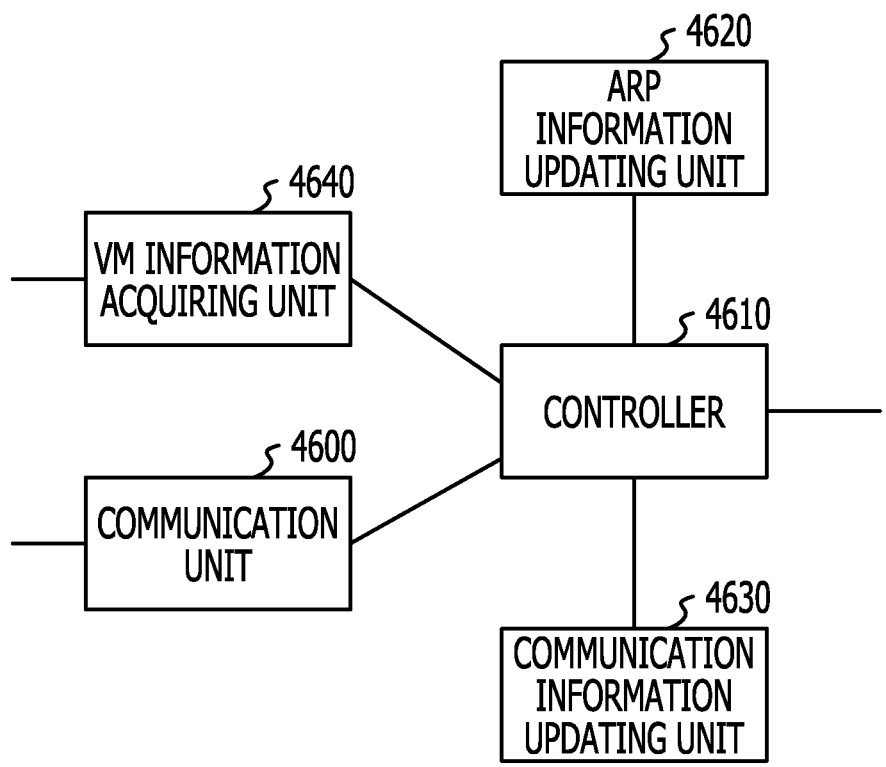
FIG. 18 illustrates functional blocks performed in the bridge (relay device) to which the embodiment is applied.
Figure 19:
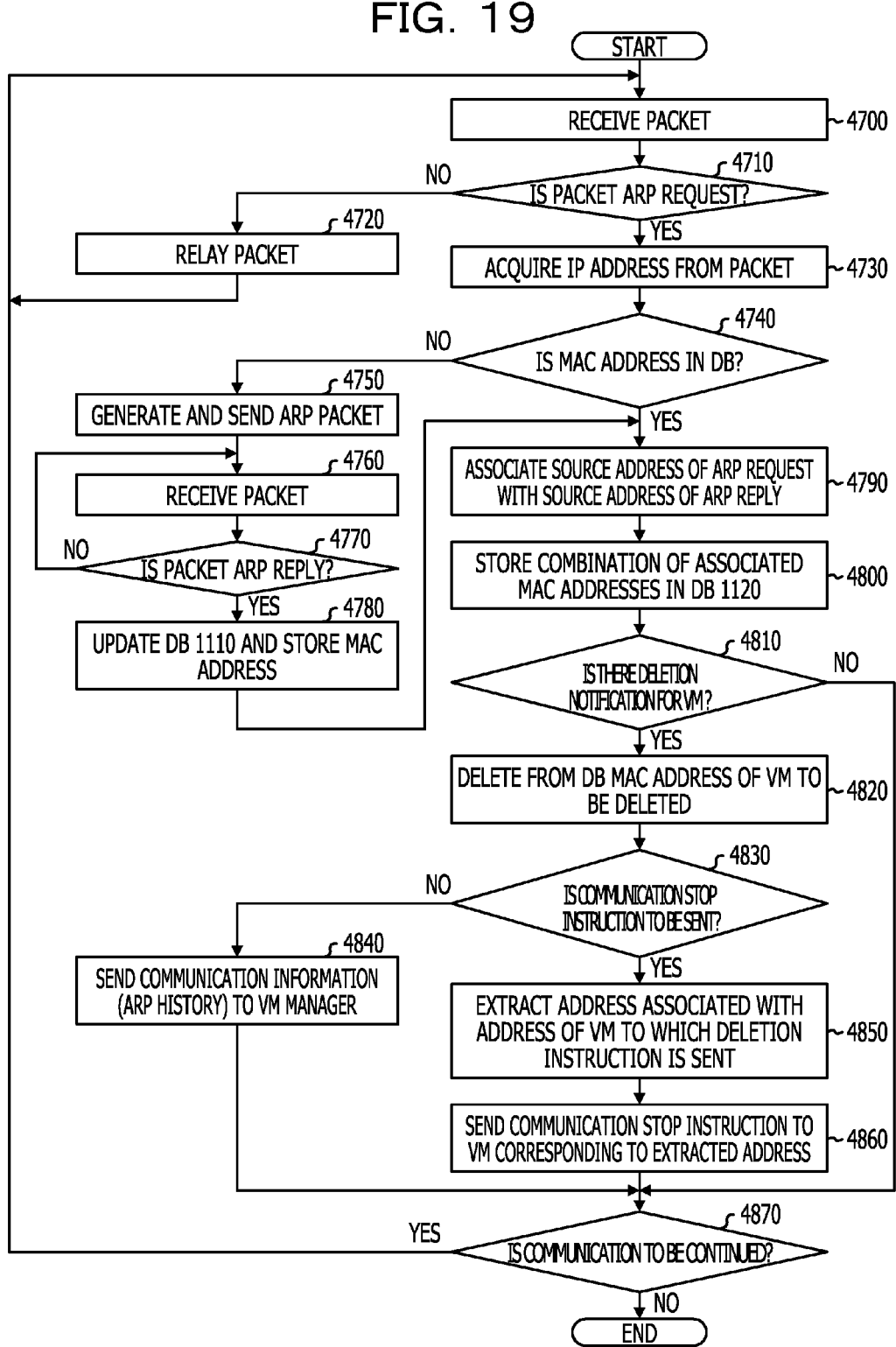
FIG. 19 illustrates a process performed in the bridge (relay device) to which the embodiment is applied.

FIG. 18 illustrates functional blocks performed in the bridge (the BR 1100) to which the embodiment is applied. The programs stored in the memory 4100 are executed by the CPU 4000, and, as a result, the BR 1100 functions as a communication unit 4600, a controller 4610, an ARP information updating unit 4620, a communication information updating unit 4630 and a VM information acquiring unit 4640. Processing performed by each functional block will be described below in such a way that the processing corresponds to a process illustrated in FIG. 19.

FIG. 19 illustrates a process performed in the BR 1100 to which the embodiment is applied. Processing 4700 of receiving a packet is performed by the communication unit 4600. Processing 4710 of determining whether the received packet is an ARP request is performed by the controller 4610. As a result of analysis of the packet received in processing 4710, if it is determined that the received packet is not an ARP request, the process proceeds to processing 4720. The controller 4610 performs processing 4720 of relaying the packet, and the process returns to processing 4700. As a result of analysis of the packet received in processing 4710, if it is determined that the received packet is an ARP request, the process proceeds to processing 4730. Processing 4730 of acquiring an IP address from the received packet is performed by the controller 4610.

Processing 4740 of determining whether the MAC address corresponding to the acquired IP address is stored in the DB 1110 is performed by the controller 4610. The controller 4610 determines based on information stored in the DB 1110 (see FIG. 6), for example, whether the MAC address corresponding to the acquired IP address has been acquired.

If it is determined in processing 4740 that the MAC address corresponding to the acquired IP address is absent in the DB 1110, processing 4750 in which an ARP packet is generated and is sent by the communication unit 4600 is performed. The received ARP request is relayed by processing 4750. If processing 4760 of receiving a packet is performed by the communication unit 4600, then processing 4770 of determining whether the packet is an ARP reply for the relayed ARP request is performed by the controller 4610. In processing 4770, if it is determined that the packet is not an ARP reply for the relayed ARP request, the process proceeds to processing 4760, whereas if it is determined that the packet is an ARP reply for the relayed ARP request, the process proceeds to processing 4780. In processing 4780, the ARP information updating unit 4620 performs processing to update the DB 1100 and store the MAC address. The determination that the packet is an ARP reply for the relayed ARP request means that because the source MAC address of the ARP packet in the ARP reply is the MAC address requested in the ARP request, the ARP information updating unit 4620 updates the DB 1110 in so that the MAC address and the IP address of the source of the ARP packet in the ARP reply are associated with each other, and the process proceeds to processing 4790. An example of the ARP packet sent in processing 4750 is notification C4 illustrated in FIG. 8, and an example of processing 4780 is processing 1530 and processing 1540 illustrated in FIG. 8.

Either, if it is determined in processing 4740 that the MAC address corresponding to the acquired IP address is present in the DB 1110, or subsequent to processing 4780, the controller 4610 performs processing 4790. In processing 4790, the controller 4610 associates the source MAC address in the ARP request with the source MAC address in the ARP reply.

Processing 4800, in which a combination of the MAC addresses associated with each other in processing 4790 is stored as communication information in the DB 1120, is performed by the communication information updating unit 4630. An example of the communication information stored in the DB 1120 is information illustrated in FIG. 7. The BR 1100 acquires communication information as a result of processing 4790 and processing 4800, and thereby acquires information for determining which virtual machine stores in the ARP cache thereof the MAC address of which virtual machine. Some of the examples of processing 4800 are processing 1550 and processing 1590 illustrated in FIG. 8.

Processing 4810 of determining whether there is a deletion notification for a VM is performed. When the VM information acquiring unit 4640 receives a deletion notification, the controller 4610 determines that the deletion notification is present. An example of the deletion notification is notification C9 illustrated in FIG. 8. If it is determined that a deletion notification is present, the controller 4610 causes an ARP information updating unit 4620 to perform processing 4820 in which the MAC address of a VM whose deletion is indicated by a deletion notification is deleted from the DB 1110. As a result of processing 4820, the BR 1100 is inhibited from mistakenly making an ARP reply on behalf of a VM in a situation where the MAC address of the VM remains stored in the DB 1110 even though the VM has been deleted. Otherwise, if it is determined that a deletion notification is absent, the process proceeds to processing 4870.

Processing 4830 of determining whether to send a communication stop instruction to VMs other than the VM to which a deletion instruction has been sent is performed by the controller 4610. If it is determined that a communication stop instruction will not be sent, then processing 4840 of sending communication information to the VM manager SV 1000 is performed. The reason why communication information is sent to the VM manager SV 1000 is that the communication information allows the VM manager SV 1000 to determine which virtual machine stores in the ARP cache thereof the MAC address of which virtual machine. For example, all of the communication information may be sent, and, instead, the MAC address of a VM associated with the VM to be deleted may be selected and sent to the VM manager SV 1000 in order to decrease occupied communication bandwidth. Additionally, processing 4840 may be performed after receipt of a request for communication information from the VM manager SV 1000. An example of processing 4840 is notification C12 illustrated in FIG. 8. After processing 4840 is completed, the process proceeds to processing 4870.

If it is determined that a communication stop instruction will be sent to VMs other than the VM to which a deletion instruction has been sent, processing 4850, which extracts addresses associated with the address of the VM to which a deletion instruction has been sent, is performed by the controller 4610. Since communication information indicates which virtual machine may have acquired the MAC address of which virtual machine, as described above, it is presumed that the MAC address of the deleted VM may be stored in the ARP cache of a VM having an address associated with the address of the VM to which a deletion instruction has been sent. That is, as a result of processing 4850, VMs, of which the ARP caches thereof may store the MAC address of the VM to which a deletion instruction has been sent, are identified, and the VMs to which communication stop instructions are to be sent are extracted.

Processing 4860 of sending communication stop instructions to VMs corresponding to addresses extracted in processing 4850 is performed. An example of the communication stop instructions is notification C12 illustrated in FIG. 8. The communication stop instruction sent in processing 4860 is an instruction for inhibiting a VM corresponding to the extracted address from sending an L3-level packet to the deleted VM. In a VM which has received the communication stop instruction, steps such as deleting the MAC address from the ARP cache or using a flag to inhibit generation or sending of a packet, and a state in which generation or sending of a packet is inhibited is brought about, as mentioned above.

Processing 4870 in which it is determined whether to continue communication is performed by the controller 4610. If it is determined that communication will be continued, the process proceeds to processing 4700. If it is determined that communication will not be continued, the process ends.

The VM manager SV 1000, which manages the generation, elimination and movement of VMs, does not manage either actual communication or the communication counterparty for each VM. The BR 1100, which is a relay device for packets, is not concerned with the generation, elimination and movement of each VM. According to the embodiment, the BR 1100, which relays ARP requests and ARP replies, stores as notification information which virtual machine may have acquired the MAC address of which virtual machine as part of ARP processing. This information is brought into close cooperation with VM information about the generation, elimination and movement of VMs managed by the VM manager SV 1000, and thus when a VM is erased, VMs storing the MAC address of the deleted VM in the ARP caches are identified. By performing steps such as deleting the MAC address of the deleted VM from the ARP caches of the identified VMs or inhibiting generation or sending of an L3-level packet to the deleted VM, an L3-level packet to the deleted VM will not be sent. As described above, for example, not all the virtual machines executed in one physical machine are used by the same user (business person). Therefore, an L3-level packet is inhibited from being sent over a network, and thus communication bandwidth and resources for other users (business persons) will not be squeezed. That is, when a service in which a plurality of users (business persons) share one physical server is provided, the effect of the embodiment which may inhibit unnecessary sending of an L3-level packet has a particularly marked effect.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
   a first computer;
   a second computer configured to store, during a given period, an address of the first computer to transmit a packet to the first computer;
   a relay device configured to relay the packet and store a history of a request for acquisition of the address, the request being received from the second computer; and
   a manager computer configured to give a notification that the first computer is disconnected from a network that is for the second computer to communicate with the first computer,
   wherein in response to the notification, it is determined based on the history whether the address is stored in the second computer, and
   wherein when the first computer is disconnected from the network and the address is stored in the second computer based on the history, the second computer stops a transmission of the packet.

2. The information processing system according to claim 1, wherein the second computer stops the transmission of the packet even if the second computer stores the address.

3. The information processing system according to claim 1, wherein the second computer is a second virtual computer executed in a physical computer in which a plurality of virtual computers are executed.

4. The information processing system according to claim 1, wherein the first computer is a first virtual computer, and disconnecting the first computer from the network is performed by deleting the first virtual computer from a physical computer in which the manager computer executes the first virtual computer.

5. The information processing system according to claim 4, wherein the manager computer gives the notification together with a notification stating that a virtual computer other than the first virtual computer is disconnected from the network.

6. The information processing system according to claim 1, wherein the second computer caches the address for a certain period of time.

7. The information processing system according to claim 1, wherein when the first computer is disconnected from the network, the second computer erases the address of the first computer stored in the second computer.

8. The information processing system according to claim 1, wherein when the first computer is disconnected from the network the second computer is inhibited from generating the packet.

9. The information processing system according to claim 1, wherein when the first computer is disconnected from the network, the second computer enters a state where sending of the packet is inhibited.

10. The information processing system according to claim 1,
wherein the first computer and the second computer are connected to layer 2 networks which are different from each other, and communication between the first computer and the second computer are relayed by the relay device.

11. The information processing system according to claim 3,
wherein the first computer and the second computer are connected to the same layer 2 network.

12. The information processing system according to claim 3,
wherein the relay device stores the address, and the address stored in the relay device is erased when the first computer is disconnected from the network.

13. An information processing device comprising:
a memory; and
a processor coupled to the memory and configured to:
store, in the memory, during a given period, an address of a first computer to transmit a packet to the first computer;
relay the packet and store a history of a request for acquisition of the address, the request being received from the second computer;
give a notification that the first computer is disconnected from a network that is for the second computer to communicate with the first computer;
in response to the notification, determine, based on the history, whether the address is stored in the second computer; and
cause the second computer to stop a transmission of a packet when the first computer is disconnected from the network.

14. The information processing device according to claim 13,
wherein the second computer is a second virtual computer executed in a physical computer in which a plurality of virtual computers are executed.

15. An information processing method comprising:
storing, in a second computer, during a given period, an address of a first computer to transmit a packet to the first computer;
relaying the packet and storing a history of a request for acquisition of the address, the request being received from the second computer;
giving a notification that the first computer is disconnected from a network that is for the second computer to communicate with the first computer;
in response to the notification, determining, based on the history, whether the address is stored in the second computer; and
when the first computer is disconnected from the network and the address is stored in the second computer based on the history, stopping a transmission of the packet from the second computer.

16. The information processing method according to claim 15,
wherein the transmission is stopped even if the second computer stores the address.

* * * * *